(12) United States Patent
Aoki

(10) Patent No.: US 11,758,008 B2
(45) Date of Patent: Sep. 12, 2023

(54) COMMUNICATION APPARATUS, CONTROL METHOD AND PROGRAM

(71) Applicant: CANON KABUSHIKI KAISHA, Tokyo (JP)

(72) Inventor: Hitoshi Aoki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 17/361,029

(22) Filed: Jun. 28, 2021

(65) Prior Publication Data
US 2021/0329080 A1 Oct. 21, 2021

Related U.S. Application Data

(63) Continuation of application No. 15/755,965, filed as application No. PCT/JP2016/003314 on Jul. 13, 2016, now Pat. No. 11,082,503.

(30) Foreign Application Priority Data

Aug. 31, 2015 (JP) ................................ 2015-171256

(51) Int. Cl.
H04L 67/51 (2022.01)
H04W 8/00 (2009.01)
H04W 52/02 (2009.01)
H04W 4/80 (2018.01)
H04W 48/16 (2009.01)
H04W 56/00 (2009.01)
H04W 84/18 (2009.01)
H04W 84/20 (2009.01)

(52) U.S. Cl.
CPC ............... H04L 67/51 (2022.05); H04W 4/80 (2018.02); H04W 8/005 (2013.01); H04W 48/16 (2013.01); H04W 52/0209 (2013.01); H04W 56/001 (2013.01); H04W 84/18 (2013.01); H04W 84/20 (2013.01); Y02D 30/70 (2020.08)

(58) Field of Classification Search
None
See application file for complete search history.

(56) References Cited

U.S. PATENT DOCUMENTS

| 10,045,196 | B2* | 8/2018 | Park | H04W 8/005 |
|---|---|---|---|---|
| 10,051,676 | B2* | 8/2018 | Qi | H04W 12/06 |
| 11,082,503 | B2* | 8/2021 | Aoki | H04W 48/16 |
| 2005/0122989 | A1* | 6/2005 | Ginzburg | H04W 74/0816 370/445 |
| 2014/0198783 | A1* | 7/2014 | Qi | H04L 7/04 370/350 |
| 2015/0181456 | A1* | 6/2015 | Kim | H04L 47/28 370/230 |
| 2015/0223047 | A1* | 8/2015 | Abraham | H04W 52/0216 370/328 |

(Continued)

Primary Examiner — Hassan A Phillips
Assistant Examiner — Gautam Sharma
(74) Attorney, Agent, or Firm — Canon U.S.A., Inc. IP Division

(57) ABSTRACT

A communication apparatus notifies that service information is to be communicated outside a cyclically repeated period in which a plurality of apparatuses including the communication apparatus transmits or receives a beacon to another communication apparatus included in the plurality of apparatuses and being a destination of the service information.

18 Claims, 11 Drawing Sheets

(56) References Cited

U.S. PATENT DOCUMENTS

| | | | |
|---|---|---|---|
| 2016/0150392 A1* | 5/2016 | Jung | H04W 8/005 |
| | | | 455/450 |
| 2016/0249409 A1* | 8/2016 | Kim | H04W 56/0015 |
| 2016/0278112 A1* | 9/2016 | Liu | H04W 8/005 |
| 2017/0006562 A1* | 1/2017 | Kim | H04W 56/001 |
| 2017/0041779 A1* | 2/2017 | Sandhu | H04W 4/80 |
| 2017/0171886 A1* | 6/2017 | Nabetani | H04B 7/0848 |
| 2021/0329080 A1* | 10/2021 | Aoki | H04W 56/001 |

* cited by examiner

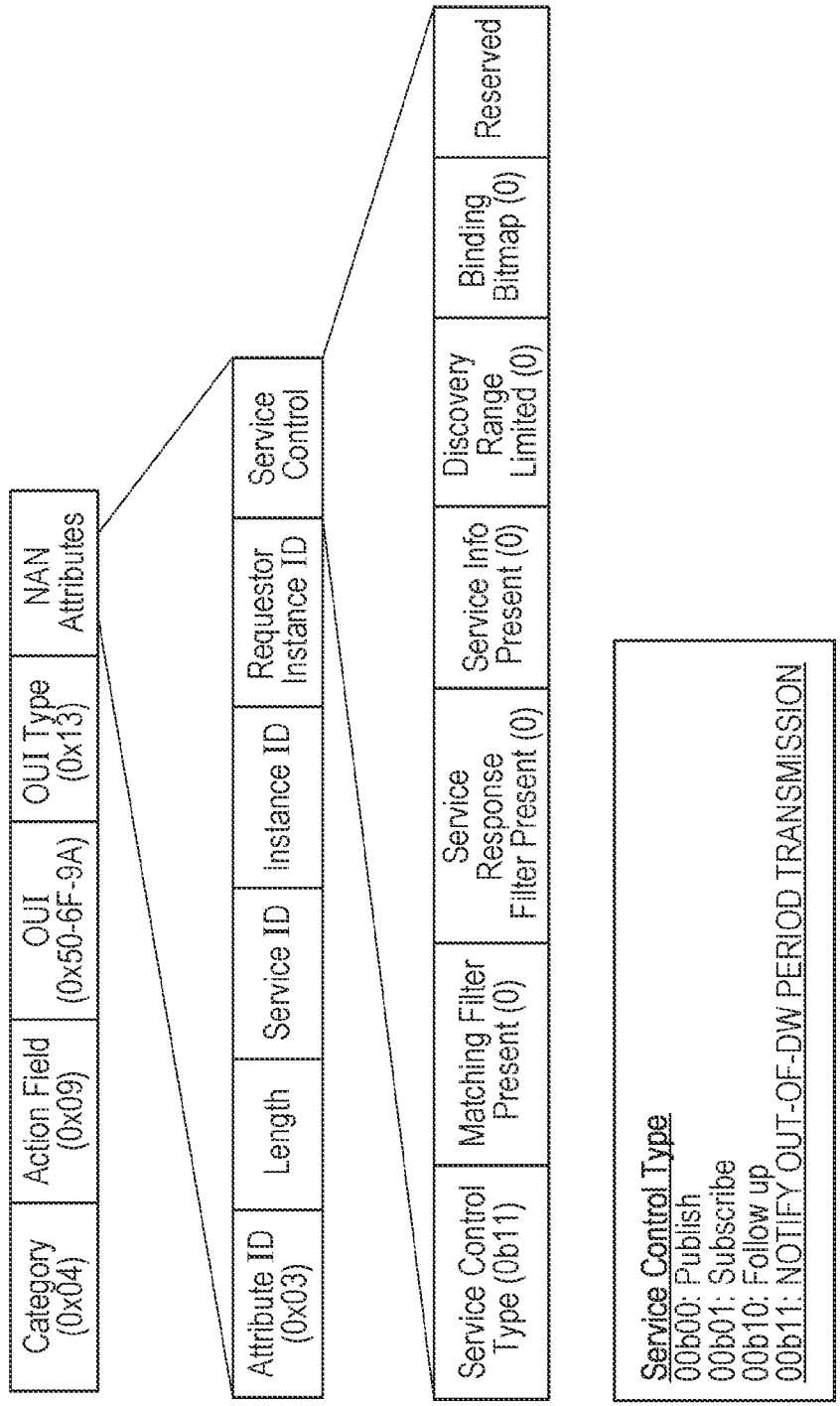

COMMUNICATION APPARATUS, CONTROL METHOD AND PROGRAM

CROSS-REFERENCE TO RELATED APPLICATIONS

This application is a continuation of U.S. patent application Ser. No. 15/755,965, filed on Feb. 27, 2018, that is a national phase application of international patent application PCT/JP2016/003314 filed on Jul. 13, 2016, and claims the benefit of, and priority to, Japanese Patent Application No. 2015-171256 filed Aug. 31, 2015, which applications are hereby incorporated by reference herein in their entireties.

TECHNICAL FIELD

The present invention relates to a communication technology.

BACKGROUND ART

PTL 1 describes about NAN (Neighbor Awareness Networking) which is a standard defined by Wi-Fi Alliance for discovering a service executable by other apparatuses. PTL 1 discloses that, according to NAN, apparatuses communicate service information in a period determined based on a beacon signal. Each of the apparatuses communicates in a predetermined period and shifts to a sleep state in which wireless communication is not performed so that a service executable by other apparatuses can be discovered in a power-saving manner.

However, in a case where service information is communicated in a predetermined period, when service information having a large data size is communicated in the period, partial apparatuses may possibly occupy the predetermined period for the communication. Such occupation of the predetermined period by partial apparatuses may prevent the other apparatuses from communicating service information or may prevent communication for synchronization of the predetermined period between apparatuses.

Even when service information is communicated outside a predetermined period, the other apparatuses may possibly have a sleep state outside the predetermined period, and communication of service information with the other apparatuses may not possibly be performed.

CITATION LIST

Patent Literature

U.S. Unexamined Patent Application Publication No. 2014/302787, Specification

SUMMARY OF INVENTION

A communication apparatus notifies that service information is to be communicated outside a cyclically repeated period in which a plurality of apparatuses including the communication apparatus transmits or receives a beacon to another communication apparatus included in the plurality of apparatuses and being a destination of the service information.

Further features of the present invention will become apparent from the following description of exemplary embodiments with reference to the attached drawings.

BRIEF DESCRIPTION OF DRAWINGS

FIG. 5 illustrates a configuration of a transmission notification frame outside a DW period according to an embodiment.

DESCRIPTION OF EMBODIMENTS

According to an embodiment, occupation of a predetermined period for communicating service information by one communication apparatus may be reduced, and the other apparatuses may be caused to recognize that service information is communicate outside the predetermined period.

Embodiments will be described with reference to attached drawings. An example applying a wireless LAN system based on a NAN standard will be described below. According to NAN, service information is communicated in a period called a Discovery Window (hereinafter, called a DW). A DW is a time period and a channel in which a plurality of devices executing NAN are converged. A set of terminals sharing a DW schedule will be called a NAN cluster.

Each of terminals belonging to a NAN cluster operates by playing one role of Master, Non-Master Sync and Non-Master Non-Sync. A terminal operating as a Master transmits a Synchronization Beacon (hereinafter, called a Sync Beacon being a beacon by which terminals can identify a DW and synchronize with it. The terminal operating as a Master transmits a Discovery Beacon being a signal for causing a terminal not belonging to the NAN cluster to recognize the NAN cluster. Such a Discovery Beacon may be transmitted every 100 ms, for example, in a period excluding a DW period. In each NAN cluster, at least one terminal operates as a Master.

A terminal operating as a Non-Master Sync transmits a Sync Beacon but does not transmit a Discovery Beacon. A terminal operating as a Non-Master Non-Sync does not transmit either Sync Beacon or Discovery Beacon.

Terminals participating in the NAN cluster synchronize with a DW period occurring in predetermined cycles in response to a Sync Beacon and communicate service information in the DW period.

The terminals mutually communicate a Subscribe message being a signal for discovering a service in a DW period and a Publish message being a signal for notifying that a service is available. The terminals can further exchange a Follow-up message usable for exchanging additional information regarding the service in a DW period. The Publish, Subscribe, and Follow-up messages may collectively be called a Service Discovery Frame (SDF). The terminals can exchange an SDF to advertise or detect a service.

Figure 1:
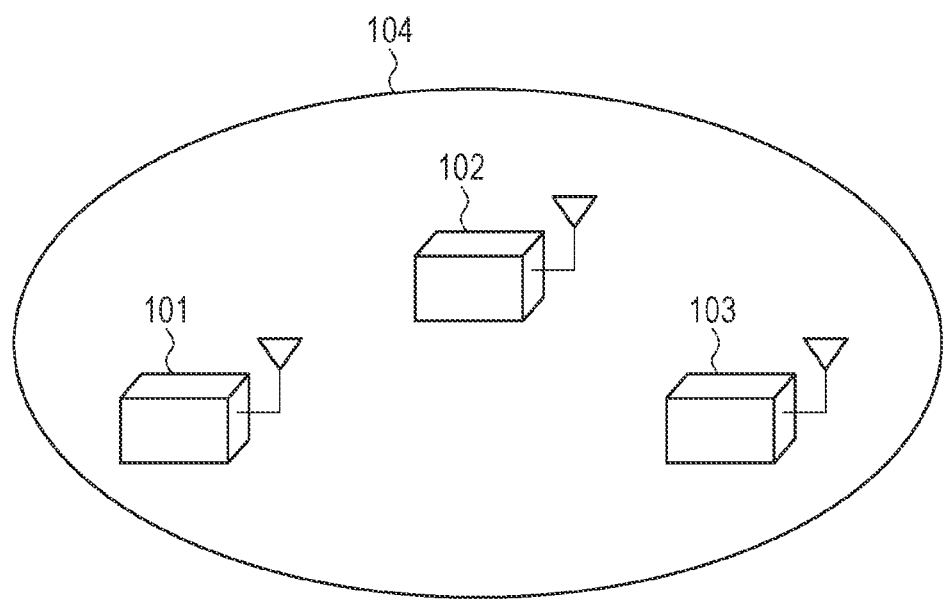
FIG. 1 illustrates a configuration of a communication system.

FIG. 1 illustrates a network configuration of a communication system according to an embodiment. Terminals 101, 102 and 103 are communication apparatuses which perform wireless communication based on a NAN standard. The terminals 101 to 103 are participating in a NAN cluster 104. Terminals participating in the NAN cluster 104 may communicate in 6ch (2.437 GHz) of a 2.4 GHz frequency band. In the NAN cluster 104, a 16-TU (Time Unit) DW is provided repetitively every 512 TUs. In other words, in the NAN cluster 104, a repetition, 16-TU DW is provided every 512 TUs. The terminals participating in the NAN cluster 104 synchronizes their DW schedules in response to a Sync Beacon transmitted and received in a DW. In this case, 1 TU is equal to 1024 μsec. Terminals belonging to the NAN cluster 104 communicate service information by using the SDF in a DW period. The terminal 101 operates as a Non-Master Non-Sync in the NAN cluster 104. The terminal 101 further operates as a Subscriber which transmits a Subscribe message for searching a service provided by a different apparatus participating in the NAN cluster.

The terminal 102 operates as a Master in the NAN cluster 104. The terminal 103 operates as a Non-Master Non-Sync in the NAN cluster 104. According to this embodiment, the terminals 102 and 103 are Publishers each of which notifies that it provides a predetermined service and information describing the predetermined service to other terminals in response to the Subscribe message.

The terminals 101, 102 and 103 operate in an awake state in which wireless communication is enabled in a DW period and operate in a sleep state in the other periods. In the sleep state, the terminals 101, 102 and 103 are disabled to perform wireless communication and consumes less power than in the awake state. The terminal 102 operating as a Master operates in the awake state even outside a DW period at a time for transmitting a Discovery Beacon.

The terminals 101 to 103 may operate by playing different roles from each other.

Figure 2:
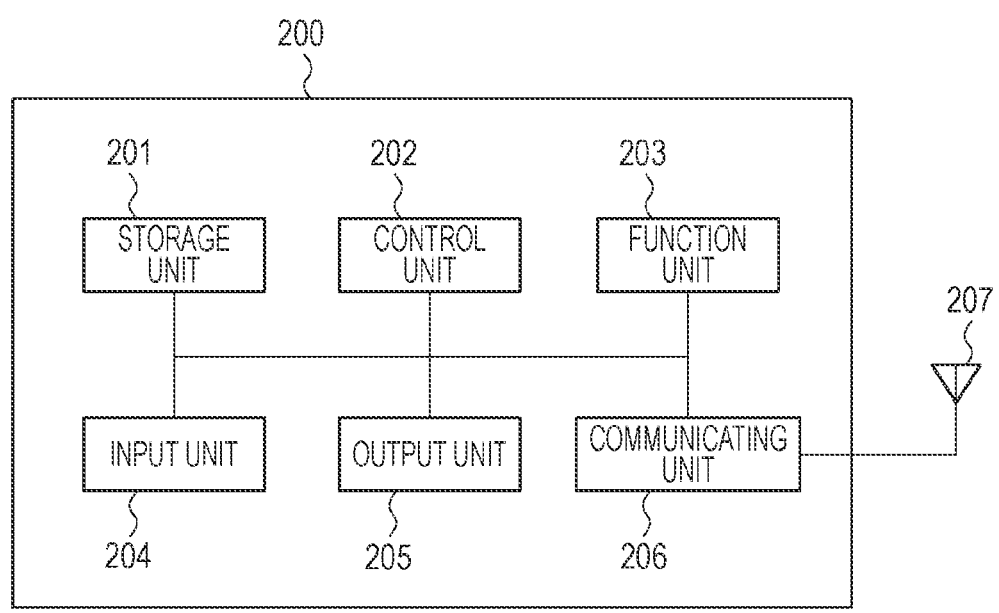
FIG. 2 illustrates a configuration of a communication apparatus.

Next, a hardware configuration of the terminals 101 to 103 will be described with reference to FIG. 2. FIG. 2 illustrates a hardware configuration of the communication apparatus 200 (terminals 101 to 103).

A storage unit 201 is configured by a memory such as a ROM and a RAM and stores programs for executing operations, which will be described below, and information such as communication parameters for wireless communication. The storage unit 201 may be, instead of a memory such as a ROM and a RAM, a storage medium such as a flexible disk, a hard disk, an optical disk, a magneto-optical disk, a CD-ROM, a CD-R, a magnetic tape, a non-volatile memory card, and a DVD. The storage unit 201 may include a plurality of memories, for example.

A control unit 202 may be configured by a processor such as a CPU and an MPU and execute a program stored in the storage unit 201 to generally control the communication apparatus 200. The control unit 202 may include a plurality of multicore processors, for example, and the plurality of processors may generally control the communication apparatus 200.

The control unit 202 controls a function unit 203 to execute a predetermined process such as imaging, printing, and projecting. The function unit 203 is a hardware used by the communication apparatus 200 to execute a predetermined process. For example, in a case where the communication apparatus 200 is a camera, the function unit 203 is an imaging unit and performs an imaging process. For example, in a case where the communication apparatus 200 is a printer, the function unit 203 is a print unit and performs a printing process. For example, in a case where the communication apparatus 200 is a projector, the function unit 203 is a projecting unit and performs a projecting process. Data to be processed by the function unit 203 may be data stored in the storage unit 201 or may be data communicated with another communication apparatus through the communicating unit 206, which will be described below.

An input unit 204 receives an operation performed by a user. An output unit 205 presents an output result to a user. In this case, the output result from the output unit 205 as described above may include at least one of a presentation on a screen, an audio output from a speaker, and a vibration output. It should be noted that both of the input unit 204 and the output unit 205 may be implemented by one module such as a touch panel. The output unit 205 may be configured by an LCD or an LED, for example, if it outputs a display presentation, it may output information visibly recognizable by a user for display control over user interfaces, for example.

The communicating unit 206 may be configured by a chip for executing communication based on IEEE (Institute of Electrical and Electronic Engineers) 802.11 series. The communicating unit 206 may control wireless communication and control IP communication. The communicating unit 206 may control an antenna 207 to transmit and receive wireless signals for wireless communication. The communication apparatus 200 communicates contents such as image data, document data, and video data with another communication apparatus through the communicating unit 206.

Operations of the communication system having the configuration as described above will be described. Each of the terminals according to this embodiment transmits an SDF having a field having a size larger than a predetermined value by transmitting the frame outside a DW period so that occupation of a band within the DW period can be prevented. Furthermore, each of the terminals according to this embodiment notifies within a DW period that a larger-sized frame is transmitted outside a DW period to cause the other apparatuses to recognize communication is performed outside a DW period.

Figure 3:
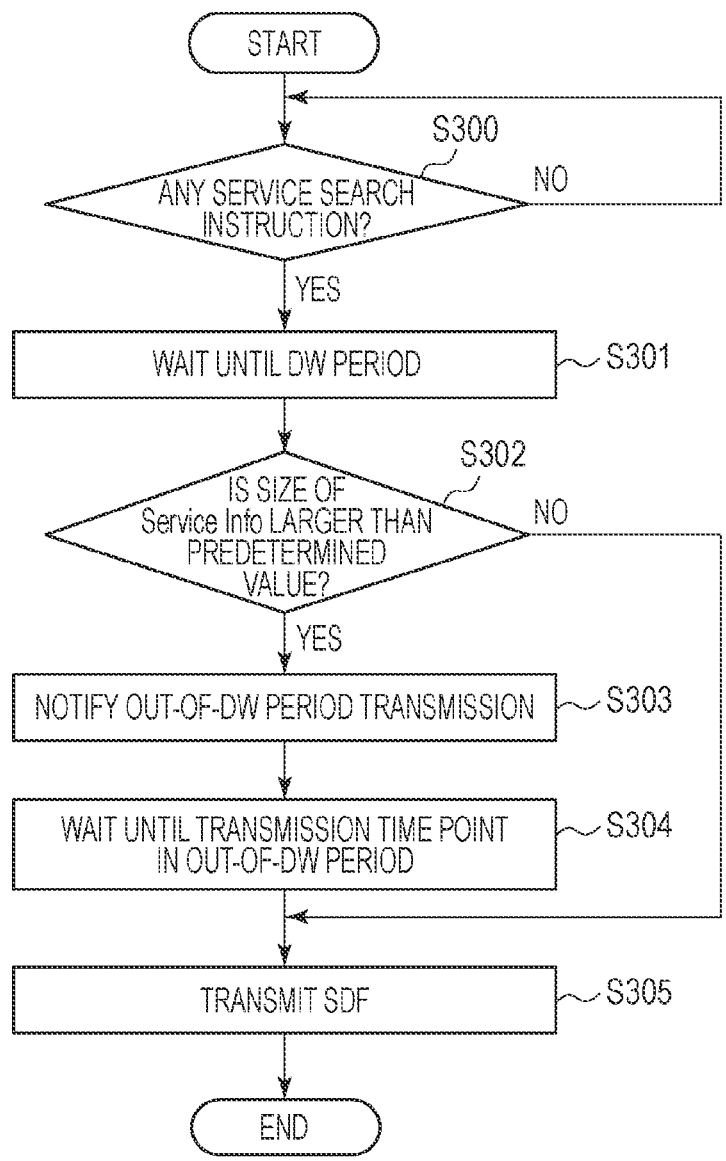
FIG. 3 is a flowchart illustrating operations to be performed by a communication apparatus.

FIG. 3 is a flowchart illustrating a flow of processing for transmitting an SDF for discovering a service by the communication apparatus 200 (one of terminals 101 to 103). The flowchart illustrated in FIG. 3 is started when a user of the communication apparatus 200 instructs to start a service search. The flowchart illustrated in FIG. 3 is implemented by execution of a control program stored in the storage unit 201 and execution of arithmetic operations and modifications on information and control over hardware by the control unit 202 in the terminal 101. Some or all of steps in the flowchart illustrated in FIG. 3 may be configured to be implemented by hardware such as an ASIC.

The communication apparatus 200 determines whether a service search instruction has been received through the input unit 204 or not (S300). If it is determined in S300 that a service search instruction has been received, the communication apparatus 200 waits until a DW period of the NAN cluster 104 starts (S301). Next, the communication apparatus 200 determines whether the data size of a Service Info of an SDF to be transmitted is larger than a predetermined value or not (S302). The determination in S302 may be performed by determining whether the size of the Service Info is larger than 255 bytes or not, for example (S302).

The Service Info is a field of an SDF defined under the NAN standard. The Service Info may include information regarding a service. For example, the Service Info of a Subscribe message may include detail information regarding a service to be searched.

The Service Info may further include a paper size or color information (grayscale printing or color printing) for printing as information regarding a printing service, for example. The communication apparatus 200 includes detail information in the Service Info so as to search a printer which can provide a printing service for printing based on a desired paper size and desired color information (grayscale printing or color printing) for printing.

The Service Info may include an image size, a resolution positional information, and information regarding the name or date of image data as information regarding the image sharing service, for example, so as to search another apparatus which holds a desired picture.

The result of the determination in S302 may vary in accordance with an input item for a search condition from a user in S300. For example, if a printing service and a paper size are designated and color information for printing is input in S300 as search conditions input by a user, the communication apparatus 200 in S302 determines that the size of the Service Info is larger than a predetermined value. If a printing service is only input in S300 as a search condition input by a user, the communication apparatus 200 in S302 determines that the size of the Service Info is larger than the predetermined value. According to the NAN standard, the length of the Service Info is limited up to 255 bytes, and a size larger than 255 bytes may not be shown in a Service Info Length field indicating the length of the Service Info. Thus, according to this embodiment, an SDF for transmitting a Service Info of 256 bytes or more is newly defined.

Figure 4:
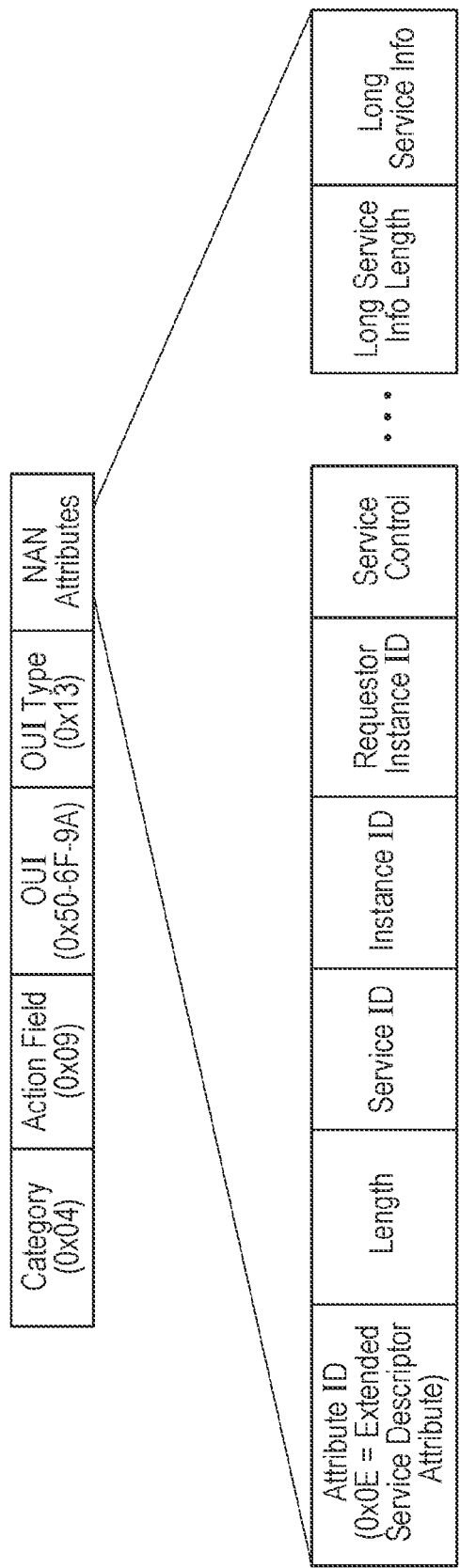
FIG. 4 illustrates a configuration of an SDF frame according to an embodiment.

FIG. 4 illustrates an example of a frame configuration of an SDF for transmitting a Service Info of 256 bytes or more. The SDF may be a Public Action Frame of IEEE802.11. The SDF has an OUI and an OUI Type having values indicating that the SDF is based on NAN. The SDF has one or more NAN Attributes for including information provided in NAN. According to this embodiment, the Service Info is communicated by extending NAN Service Descriptor Attributes (NAN SDA) which are NAN Attributes. According to this embodiment, the extended NAN SDA will is called NAN Extended SDA (NAN ESDA).

NAN ESDA has Long Service Info Length and Long Service Info fields instead of Service Info Length and Service Info of NAN SDA. The Long Service Info Length field can have information of 2 bytes and thus show the size of Service Info exceeding 255 bytes. The Long Service Info can have information of a length exceeding 255 bytes. According to this embodiment, the Long Service Info has information of 0 bytes to 1500 bytes.

FIG. 4 illustrates Extended Service Descriptor Attribute only as NAN Attributes but may give information necessary for discovery and detection of a service.

Having described that the communication apparatus 200 in S302 determines whether the size of Service Info is larger than a predetermined value or not, whether the size of information in another field of the SDF is larger than a predetermined value or not may be determined. The communication apparatus 200 in S302 may determine whether the size of the entire SDF is larger than a predetermined value or not. In this case, for example, whether the length of the SDF is larger than 1000 bytes or not may be determined. Having described that the determination in S302 is performed in a DW period, it may be performed before a DW period starts. In this case, the communication apparatus 200 waits until a DW period starts for executing S303 or S305, which will be described below.

If it is determined in S302 that the size of the Service Info is not larger than the predetermined value (such as 255 bytes), the communication apparatus 200 transmits an SDF including the Service Info within the DW period (S305).

On the other hand, if it is determined in S302 that the size of the Service Info exceeds the predetermined value (such as 255 bytes), the communication apparatus 200 transmits within the DW period a message notifying that the SDF is to be transmitted outside a DW period to other apparatuses in the NAN cluster 104 to which the communication apparatus 200 is participating (S303).

The message transmitted in S303 for notifying that an SDF is to be transmitted outside a DW period will be called an out-of-DW transmission notification frame. The out-of-DW transmission notification frame will be described with reference to FIG. 5.

FIG. 5 illustrates an example of a frame configuration of the out-of-DW transmission notification frame. The out-of-DW transmission notification frame has a different value from those of Publish, Subscribe and Follow-up in Service Control Type being a field showing a type of SDF. This embodiment assumes that the value of Service Control Type in the out-of-DW transmission notification frame is 0b11. The out-of-DW transmission notification frame may be a Subscribe message, a Publish message or a Follow-up message.

The out-of-DW transmission notification frame may include information describing timing for transmitting an SDF outside a DW period.

Notably, the SDF transmission time point outside a DW period may be after a lapse of a specific period of time from the end of a DW period. For example, the communication apparatus 200 having transmitted the out-of-DW transmission notification frame may transmit an SDF during period from 100 TU (=100×1024 μsec) to 150 TUs from the time of the end of the DW period in which the frame is transmitted. In this case, the apparatus receiving the frame recognizes that the frame has been transmitted during a period of 100 TUs to 150 TUs from the end of the DW period in which the frame is received. In a case where the SDF transmission time point outside a DW period is after a lapse of a specific time after the end of the DW period, the information describing the SDF transmission time point outside a DW period may not be included in the out-of-DW transmission notification frame.

The out-of-DW transmission notification frame may include an address of a destination terminal of an SDF to be transmitted outside a DW period or include channel information describing a frequency band in which the SDF to be transmitted outside a DW period is communicated.

Illustrating Service Descriptor Attribute only as NAN Attributes in FIG. 5, information necessary for discovery and detection of a service may additionally be given.

Referring back to FIG. 3, the communication apparatus 200 transmits the out-of-DW transmission notification frame in S303 and waits until a transmission time point outside a DW period (S304). At a transmission time point outside a DW period, the communication apparatus 200 transmits an SDF having Service Info larger than 255 bytes (S305). The SDF to be transmitted in S305 may be a Subscribe message or a Follow-up message.

An apparatus having received the SDF outside a DW period may transmit a response to the received SDF outside a DW period. Thus, the communication apparatus 200 may wait outside a DW period for the response to an SDF transmitted outside a DW period.

Figure 7:
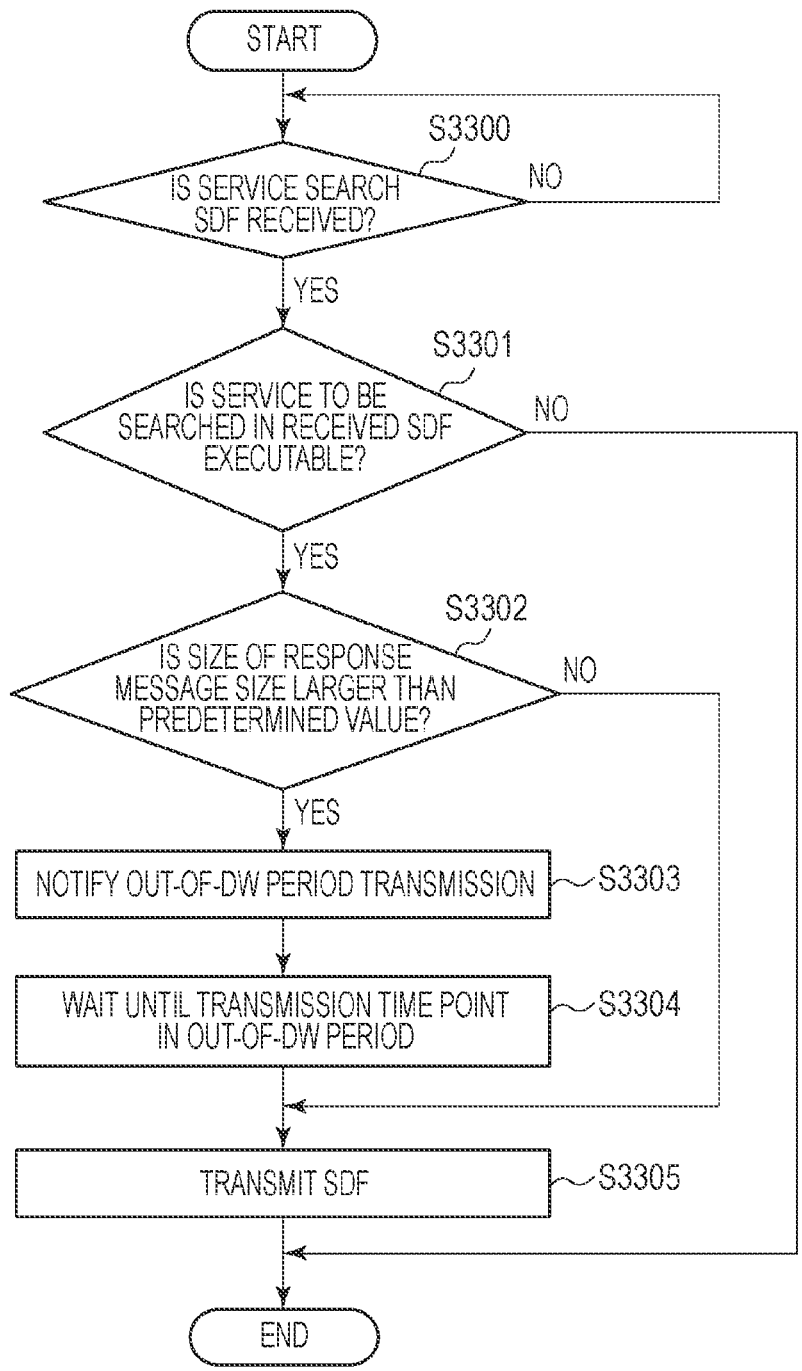
FIG. 7 is a flowchart illustrating operations to be performed by a communication apparatus.

FIG. 7 is a flowchart illustrating a flow of processing for transmitting an SDF being the response message in a case where the communication apparatus 200 (one of the terminals 101 to 103) receives an SDF for discovering a service. The flowchart illustrated in FIG. 7 is started in response to an SDF for discovering a service received by the communication apparatus 200. The flowchart illustrated in FIG. 7 is implemented by execution of a control program stored in the storage unit 201 and execution of arithmetic operations and modifications on information and control over hardware by the control unit 202 in the terminal 101. Some or all of steps in the flowchart illustrated in FIG. 7 may be configured to be implemented by hardware such as an ASIC.

The communication apparatus 200 determines whether an SDF for searching a service has been received or not (S3300). The SDF received in S3300 may be a Subscribe message, for example. The communication apparatus 200 having received the SDF for searching a service in S3300 determines whether a search target service in the received SDF is executable or not (S3301).

If the search target service in the received SDF is not executable, the communication apparatus 200 ends the processing. On the other hand, if the search target service is executable in the received SDF, the communication apparatus 200 determines whether the size of the response message to be transmitted is larger than a predetermined value or not (S3302). The determination in S3302 is performed by determining whether the size of the Service Info, for example, exceeds 255 bytes or not.

The determination in S3302 is performed by determining whether detail information such as a paper size or color information (grayscale printing or color printing) for printing, for example, is to be included as information regarding a printing service in the response message or not.

The result of the determination in S3302 may vary in accordance with the SDF received in S3000. For example, if a printing service and a paper size are designated and detail information such as color information for printing is requested as service search conditions in the SDF received in S3000, the communication apparatus 200 in S3302 determines to transmit an SDF larger than a predetermined value. If detail information is not requested as a service search condition in the SDF received in S3000, the communication apparatus 200 in S3302 determines to transmit an SDF having a size smaller than the predetermined value.

In S3302, the communication apparatus 200 may determine whether the size of information in another field of the SDF is larger than a predetermined value or not.

If it is determined in S3302 that the size of the response message is not larger than the predetermined value, the communication apparatus 200 transmits an SDF being the response message within a DW period (S3305).

On the other hand, if it is determined that the size of the response message is larger than the predetermined value, the communication apparatus 200 transmits a out-of-DW transmission notification frame being a message notifying to transmit an SDF outside a DW period to the source of the response message within a DW period (S3303).

The communication apparatus 200 transmits the out-of-DW transmission notification frame in S3303 and waits until a transmission time point outside a DW period (S3304). At a transmission time point outside a DW period, the communication apparatus 200 transmits an SDF being the response message larger than the predetermined size (S3305). The SDF to be transmitted in S3305 may be a Publish message or a Follow-up message.

Figure 6A:
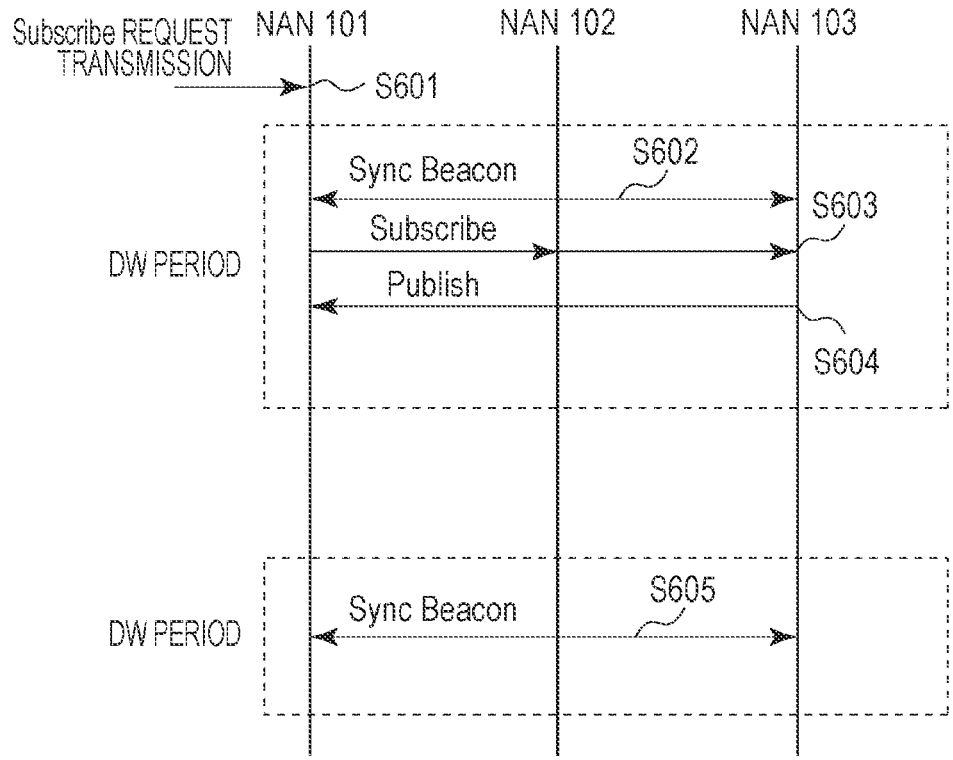
FIG. 6A illustrates a sequence of a communication system.

Next, a sequence of the communication system according to this embodiment will be described with reference to FIGS. 6A to 6D. FIG. 6A is a sequence chart in a case where an SDF is exchanged in a DW period. Referring to FIG. 6A, the terminal 101 receives a service search instruction for discovering a service from a user's operation for requesting transmission of a Subscribe message (S601). The terminal 101 waits until a DW period starts. When a DW period starts, the terminal 102 being a Master in the NAN cluster 104 transmits a Sync Beacon (S602). The Sync Beacon is a frame based on the NAN standard and is a signal for synchronization of terminals participating in the NAN cluster 104. The Sync Beacon includes time information describing a DW and information by which a NAN cluster is identified.

When the terminal 101 receives the Sync Beacon and recognizes that a DW period has started, the terminal 101 transmits a Subscribe message for discovering a service (S603). In this case, it is assumed that the size of the Service Info included in the Subscribe message is equal to or smaller than a predetermined value (such as 255 bytes). Thus, the terminal 101 transmits the Subscribe message within the DW period in S603.

Because the terminal 103 is capable of executing the service requested by the terminal 101, the terminal 103 transmits a Publish message notifying that the service is executable (S604). Because the terminal 102 is not capable of executing the service requested by the terminal 101, the terminal 102 does not respond to the Subscribe message received from the terminal 101.

When the terminal 101 receives the Publish message from the terminal 103, communication for executing the service may be performed, which is omitted in FIG. 6. For execution of the service, the terminal 101 and the terminal 103 may separately establish a wireless network for executing the service by using Wi-Fi Direct (registered trademark), for example.

When the DW period ends, the terminals 101 to 103 restricts the communication of an SDF being the service information. When a DW period is started again, the terminal 102 being a Master transmits a Sync Beacon (S605).

Figure 6B:
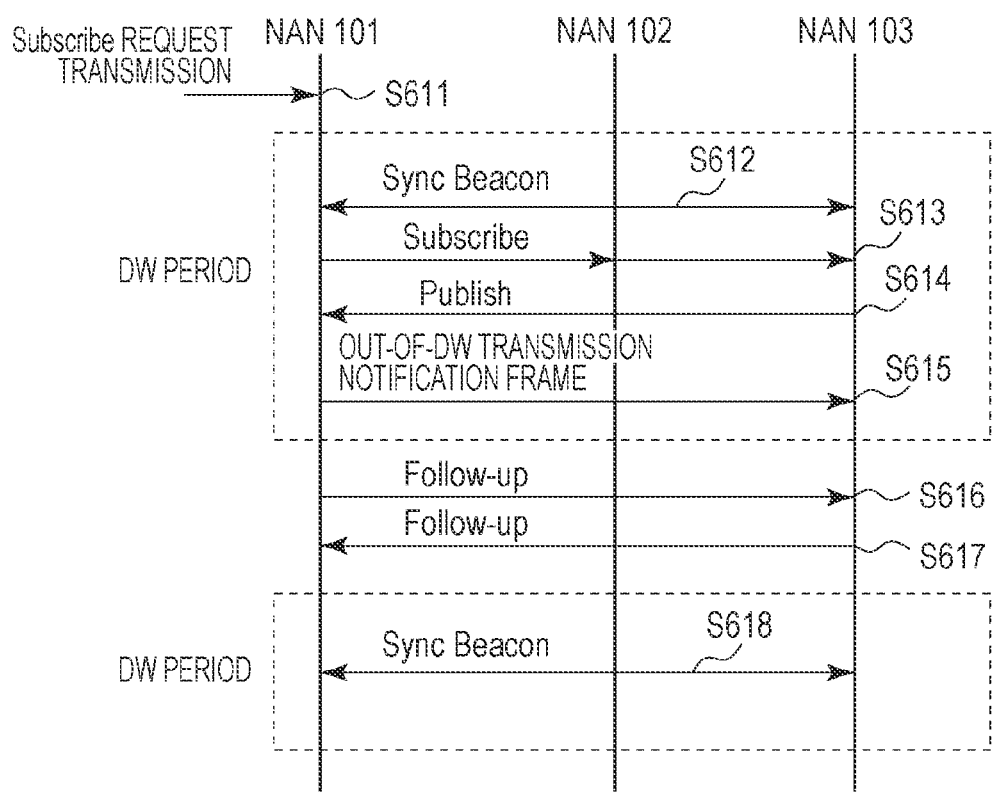
FIG. 6B illustrates a sequence of a communication system.

Next, an example of a sequence for exchanging SDFs outside a DW period will be described with reference to FIG. 6B. Because the processing in S611 to S614 in FIG. 6B is the same as the processing in S601 to S604 in FIG. 6A, repetitive descriptions will be omitted.

When the terminal 101 receives the Publish message from the terminal 103, the terminal 101 attempts to transmit a Follow-up message being an SDF for requesting detail information regarding the service. In this case, it is assumed that the size of the Service Info of the Follow-up message to be transmitted is not larger than 255 bytes.

Because the terminal 101 transmits an SDF for Service Info having a size larger than 255 bytes, the terminal 101 determines to transmit the SDF outside a DW period. Therefore, the terminal 101 transmits an out-of-DW transmission notification frame to the terminal 103 (S615).

When the DW period ends, the terminal 101 waits until a transmission time point described in the out-of-DW transmission notification frame and transmits a Follow-up message being an SDF for requesting detail information to the terminal 103 (S616). The terminal 103 responds with the Follow-up message for communicating detail information of the service to the terminal 101 (S617). When a DW period starts again, the terminal 102 being a Master transmits a Sync Beacon (S618).

Figure 6C:
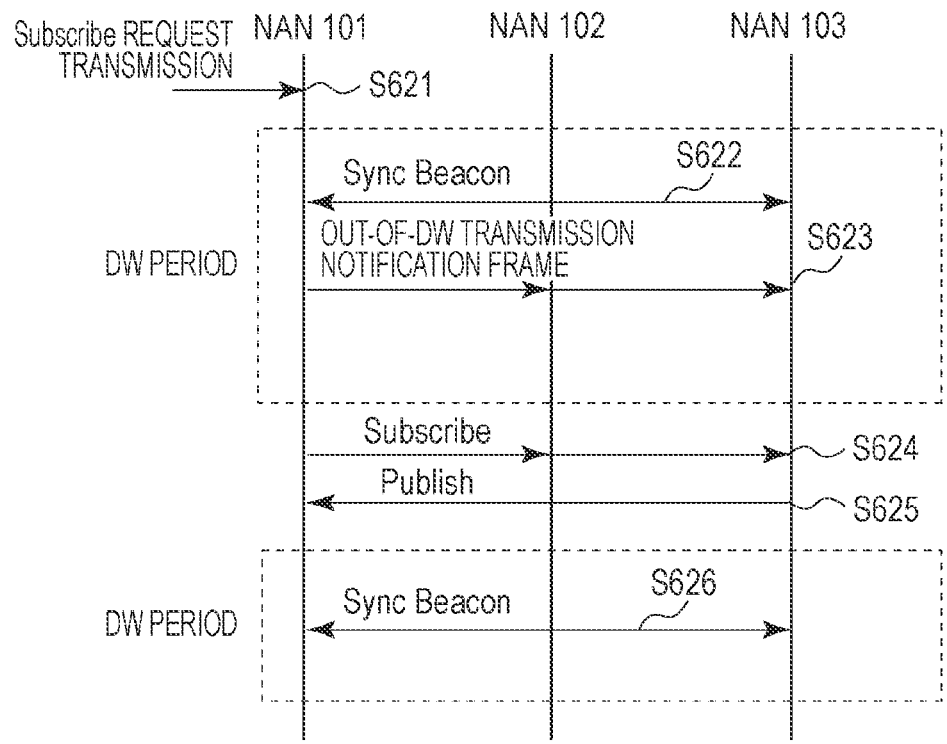
FIG. 6C illustrates a sequence of a communication system.

Next, an example of a sequence for exchanging SDFs outside a DW period will be described with reference to FIG. 6C. Referring to FIG. 6C, it is assumed that the terminal 101 receives a service search instruction to search detail information for discovering a service from a user's operation for requesting transmission of a Subscribe message (S621). The terminal 101 waits until a DW period starts. When a DW period starts, the terminal 102 being a Master in the NAN cluster 104 transmits a Sync Beacon (S622).

When the terminal 101 receives the Sync Beacon and recognizes that a DW period has started, the terminal 101 determines to transmit a Subscribe message for discovering a service. In this case, it is assumed that the size of the Service Info included in the Subscribe message is larger than a predetermined value (such as 255 bytes). Thus, the terminal 101 transmits an out-of-DW transmission notification frame (S623).

When the terminals 102 and 103 receive the out-of-DW transmission notification frame, the terminals 102 and 103 wait for the SDF in the transmission time point described in the out-of-DW transmission notification frame outside a DW period. When the DW period ends, the terminal 101 waits until the transmission time point described in the out-of-DW transmission notification frame and transmits a Subscribe message being an SDF for requesting detail information (S624). Because the terminal 103 is capable of executing the service requested by the terminal 101, the terminal 103 transmits a Publish message for notifying that the service is executable (S625). Because the terminal 102 is not capable of executing the service requested by the terminal 101, the terminal 102 does not respond to the Subscribe message received from the terminal 101. When a DW period is started again, the terminal 102 being a Master transmits a Sync Beacon (S626).

Figure 6D:
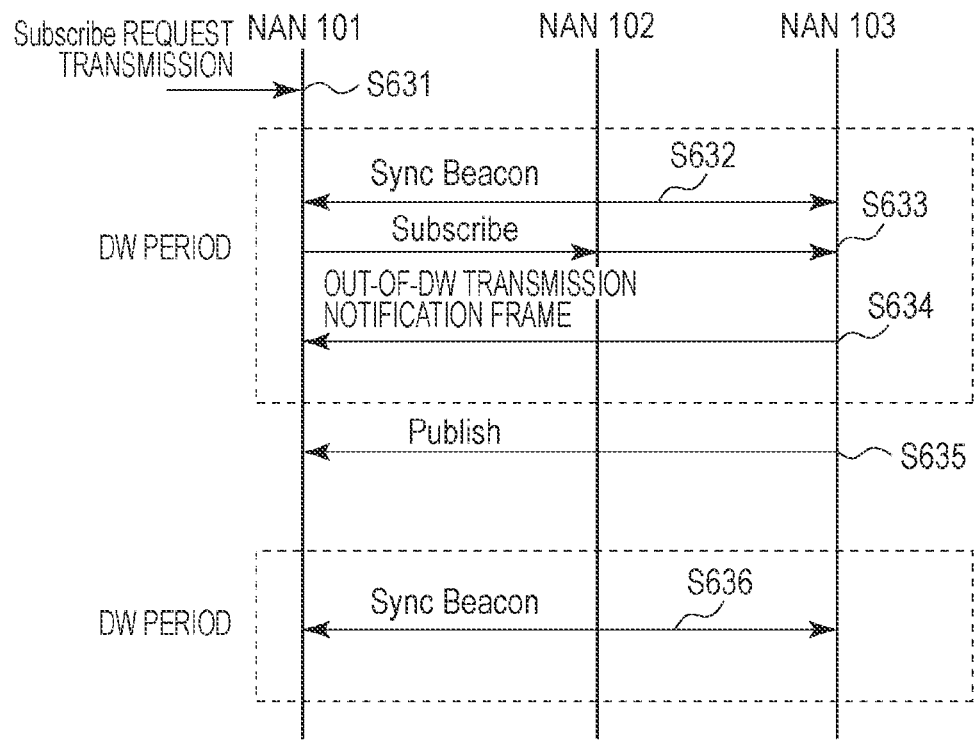
FIG. 6D illustrates a sequence of a communication system.

Next, another example of a sequence for exchanging SDFs outside a DW period will be described with reference to FIG. 6D. Referring to FIG. 6D, it is assumed that the terminal 101 receives a service search instruction for discovering a service from a user's operation for requesting transmission of a Subscribe message (S631). The terminal 101 waits until a DW period starts. When a DW period starts, the terminal 102 being a Master in the NAN cluster 104 transmits a Sync Beacon (S632).

When the terminal 101 receives the Sync Beacon and recognizes that a DW period has started, the terminal 101 determines to transmit a Subscribe message for discovering a service. In this case, it is assumed that the size of the Service Info included in the Subscribe message is smaller than a predetermined value (such as 255 bytes). Thus, the terminal 101 transmits a Subscribe message in the DW period (S633).

In response to the Subscribe message, because the terminal 103 is capable of executing the service requested by the terminal 101, the terminal 103 determines to transmit a Publish message for notifying that the service is executable. Because the terminal 102 is not capable of executing the service requested by the terminal 101, the terminal 102 does not respond to the Subscribe message received from the terminal 101.

Because the received Subscribe message includes information for requesting detail information, the size of the Publish message to be transmitted by the terminal 103 is larger than a predetermined value. Thus, the terminal 103 transmits an out-of-DW transmission notification frame to the terminal 101 (S634).

In order to receive the SDF outside a DW period, the terminal 101 waits for the SDF in a transmission time point described in the out-of-DW transmission notification frame. When the DW period ends, the terminal 103 waits until the transmission time point described in the out-of-DW transmission notification frame and transmits a Publish message being an SDF for notifying detail information regarding the executable service (S635). When a DW period is started again, the terminal 102 being a Master transmits a Sync Beacon (S636).

According to this embodiment, in a case where an SDF having a size larger than a predetermined value is communicated, the SDF is communicated outside a DW period. This can reduce occupation of a band by partial apparatuses participating in a NAN cluster within a DW period. This can further reduce failure to communicate service information by the other apparatuses participating in the NAN cluster within the DW period. This further can reduce failure to transmit a Sync Beacon by a Master in the NAN cluster and failure to maintain synchronization in the NAN cluster.

According to this embodiment, communicating the SDF outside a DW period is notified within a DW period. Thus, because the other communication apparatus can recognize that an SDF is communicated outside a DW period, failure to execute communication of the SDF due to a sleep state of the other communication apparatus in a DW period.

Having described that, according to the aforementioned embodiment, communication of an SDF outside a DW period is notified by using an out-of-DW transmission notification frame, a Sync Beacon, for example, may be used to notify that an SDF is communicated outside a DW period.

Here, if the communication apparatus 200 is a Non-Master Non-Sync which does not transmit a Sync Beacon in the NAN cluster, the communication apparatus 200 changes its role to a Master or a Non-Master Sync. To change its role to a Master, the communication apparatus 200 may have an increased Master Preference which is a priority level for determining to change its role to Master.

The Sync Beacon frame for notifying that an SDF is communicated outside a DW period may include an Attribute ID having a unique value (such as 0x0F), for example, where the Attribute ID indicates the type of an information element. The Sync Beacon frame for notifying that an SDF is communicated outside a DW period may include Vendor Specific Attribute as the Attribute ID. An Attribute Body Field may include information designating a transmission time point of an SDF outside a DW period. In a case where the Sync Beacon frame is used to notify that an SDF is communicated outside a DW period, the communication of the SDF may be started after a lapse of a predetermined time period after a DW period without including information designating a transmission time point for the SDF outside a DW period.

The Sync Beacon frame for notifying that an SDF is communicated outside a DW period may include an address of a destination terminal of the SDF transmitted outside a DW period. The Sync Beacon frame may further include channel information describing a frequency band for communicating the SDF to be transmitted outside a DW period.

In this case, an Attribute ID indicating the type of an information element may have a unique value (such as 0x10), for example. The Sync Beacon may have a separate field for notifying the channel information and transmission time point.

Including channel and time information for transmitting a frame outside a DW period in a Sync Beacon which is a synchronization signal for maintaining synchronization in a NAN cluster can reduce the number of frames to be transmitted within a DW period.

Figure 8:
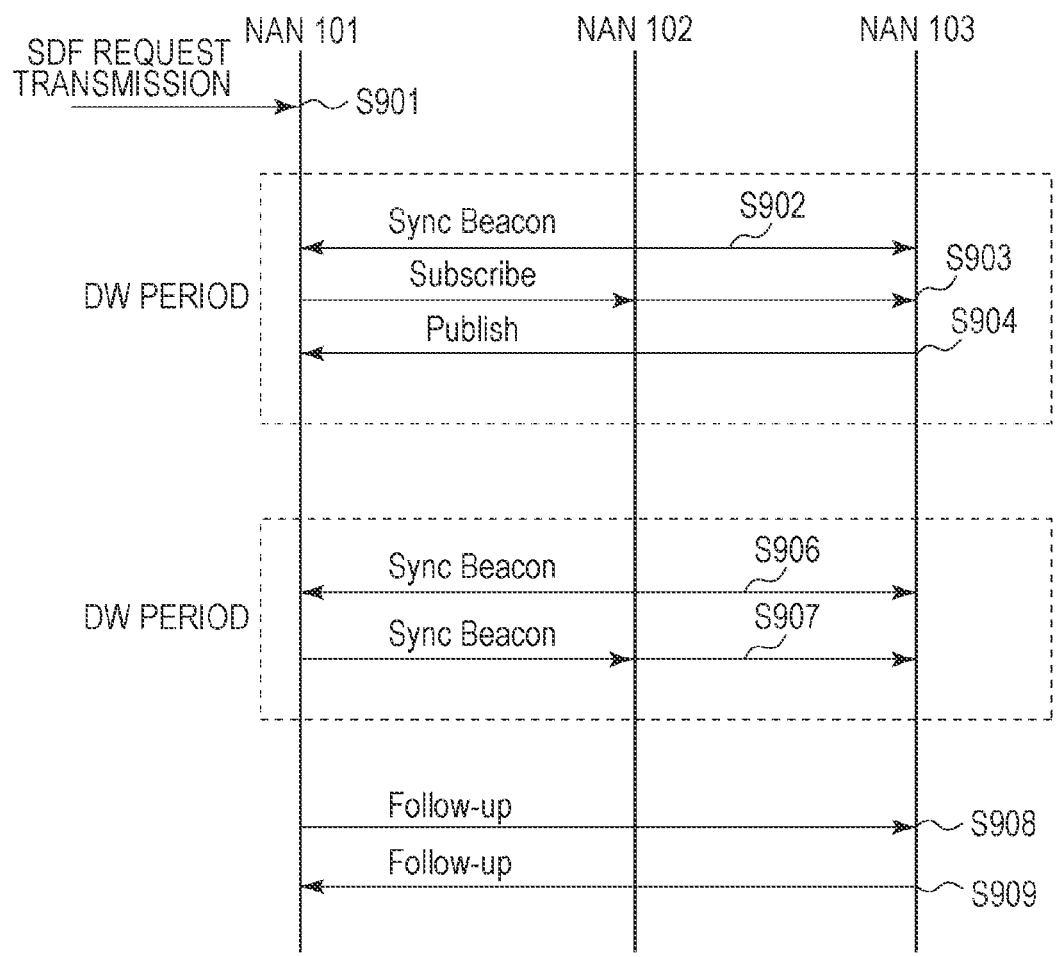
FIG. 8 illustrates a sequence of a communication system.

A sequence to be performed by the communication system according to this embodiment in a case where the Sync Beacon frame is used to notify that an SDF is communicated outside a DW period will be described with reference to FIG. 8. Because the processing in S901 to S904 in FIG. 8 is the same as the processing in S611 to S614 in FIG. 6B, repetitive descriptions will be omitted.

When the terminal 101 receives a Publish message from the terminal 103, the terminal 101 determines to transmit a Follow-up message which is an SDF for requesting detail information regarding a service. It is assumed here that the size of the Service Info in the Follow-up message to be transmitted is larger than 255 bytes.

Because the terminal 101 transmits an SDF including the Service Info larger than 255 bytes, the terminal 101 determines to transmit the SDF outside a DW period. For that reason, the terminal 101 changes its role in the NAN cluster 104. The terminal 101 changes its role to a Master here. According to the NAN standard, the role change is performed after a DW ends rather than during a DW. Therefore, the terminal 101 waits until a next DW period without transmitting a Sync Beacon in the DW period in which the frame is received in S904. When the next DW period starts, the terminal 101 and the terminal 102 each being a Master transmit a Sync Beacon (S906, S907). In this case, the Sync Beacon to be transmitted by the terminal 101 in S907 includes information notifying the presence of an SDF to be transmitted outside a DW period.

Because the subsequent processing in S908 and S909 is the same as the processing in S616 and S617 in FIG. 6B, repetitive description will be omitted.

Using a Sync Beacon to notify the presence of an SDF to be transmitted outside a DW period can reduce the number of frames to be transmitted within a DW period and allows efficient communication of service information within the DW period.

The notification method may be changed in accordance with the role of the communication apparatus 200 in the NAN cluster. In other words, when the communication apparatus 200 plays a role of Master or Non-Master Sync, a Sync Beacon may be used to notify the presence of a frame to be transmitted outside a DW period. On the other hand, if the communication apparatus 200 plays a role of Non-Master Non-Sync, an out-of-DW transmission notification frame may be transmitted to notify the presence of a frame to be transmitted outside a DW period.

Figure 9:
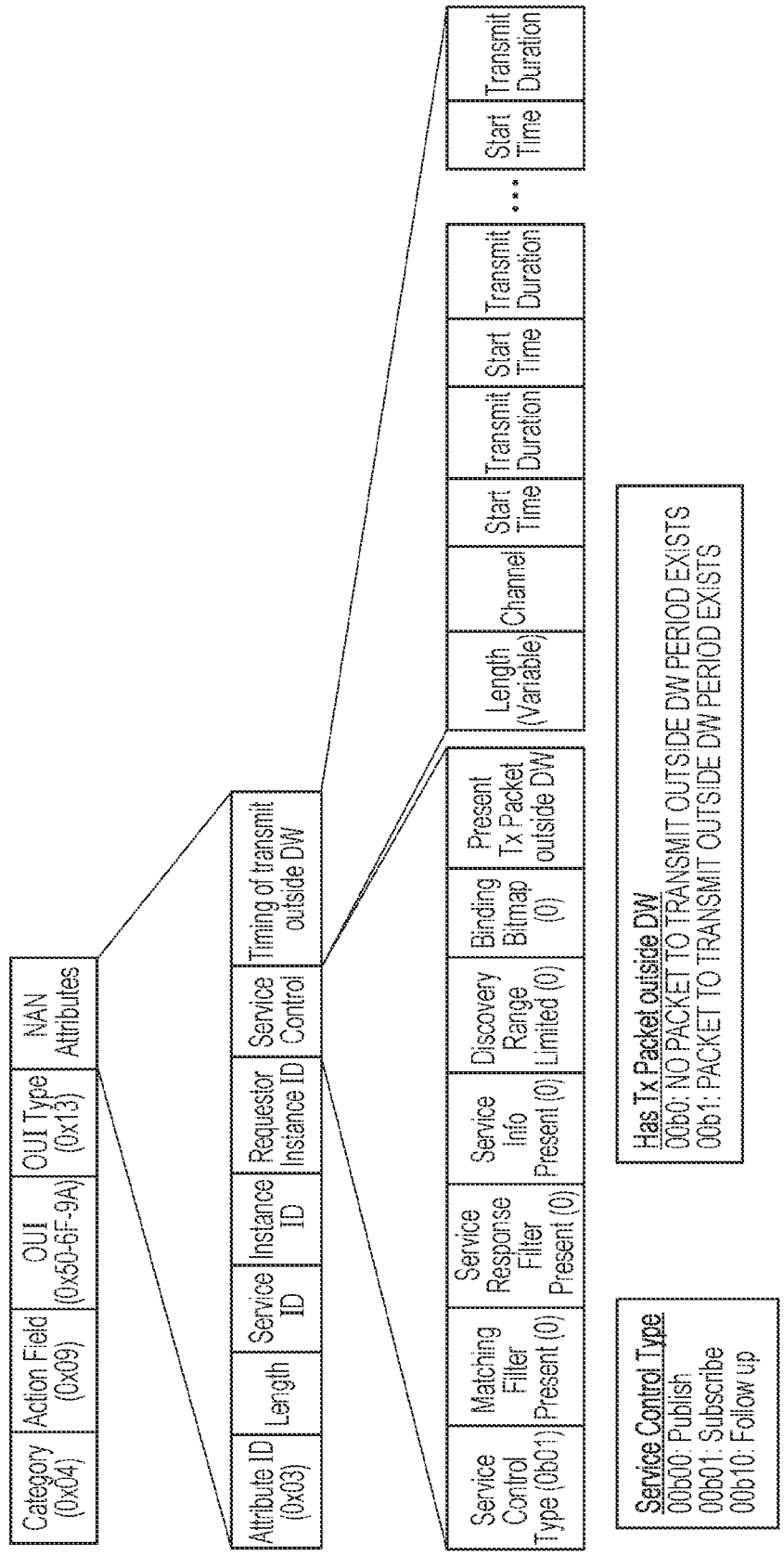
FIG. 9 illustrates a configuration of a transmission notification frame outside a DW period according to an embodiment.

A Service Control field may be used to indicate the presence of an SDF to be transmitted outside a DW period. In the example in FIG. 9, the Service Control field includes a "Present Tx Packet outside DW" field which can indicate the presence/absence of an SDF to be transmitted outside a DW period. When the "Present Tx Packet outside DW" field has a value 1, it indicates the presence of a frame to be transmitted outside a DW. When it has a value 0, it indicates the absence of a frame to be transmitted outside a DW.

When an SDF to be transmitted outside a DW period exists, a field may further be provided for including an SDF transmission time point outside a DW period and channel information relating to the communication. In the example in FIG. 9, a "Timing of transmit outside DW" field is provided to indicate an SDF transmission time point outside a DW period and channel information relating to the communication. The Timing of transmit outside DW field may include channel information (channel) and information describing the possible number of TUs necessary for starting transmission (Start Times) after a DW ends. The Timing of transmit outside DW field may include information describing the possible number of TUs (Transmit Durations) after Start Time for transmission.

A case will be described in which the Timing of transmit outside DW field has values of channel=2, Start Time=100, Transmit Duration=50. In this case, the values indicate that an SDF is to be communicated on a wireless channel 2ch during a period corresponding to 50 TUs after 100 TUs from the end of a DW period in which the message is transmitted.

A plurality of Timing of transmit outside DW fields may be provided for communication of SDFs outside DW periods at a plurality of time points.

Thus, a plurality of periods outside DW periods can be designated so that continuous occupation of a band over a long period of time for transmitting a large amount of data. Furthermore, a channel excluding 6ch used according to NAN can be designated so as not to disturb communication performed by other apparatuses participating in the NAN cluster.

The timing of outside a DW period and the channel for transmission may be indicated by Bitmap such as Further Availability Map Attribute.

Before a frame is transmitted outside a DW, a transmitting side and a receiving side may negotiate a transmission time point for a frame, and a frame having a size larger than a predetermined value may then be transmitted outside a DW. For example, when a terminal is participating in a NAN cluster and is also participating in another wireless network, communication over the other wireless network may be required to be performed outside a DW, which requires negotiation of a transmission time point between a transmitting side and a receiving side.

Figure 10:
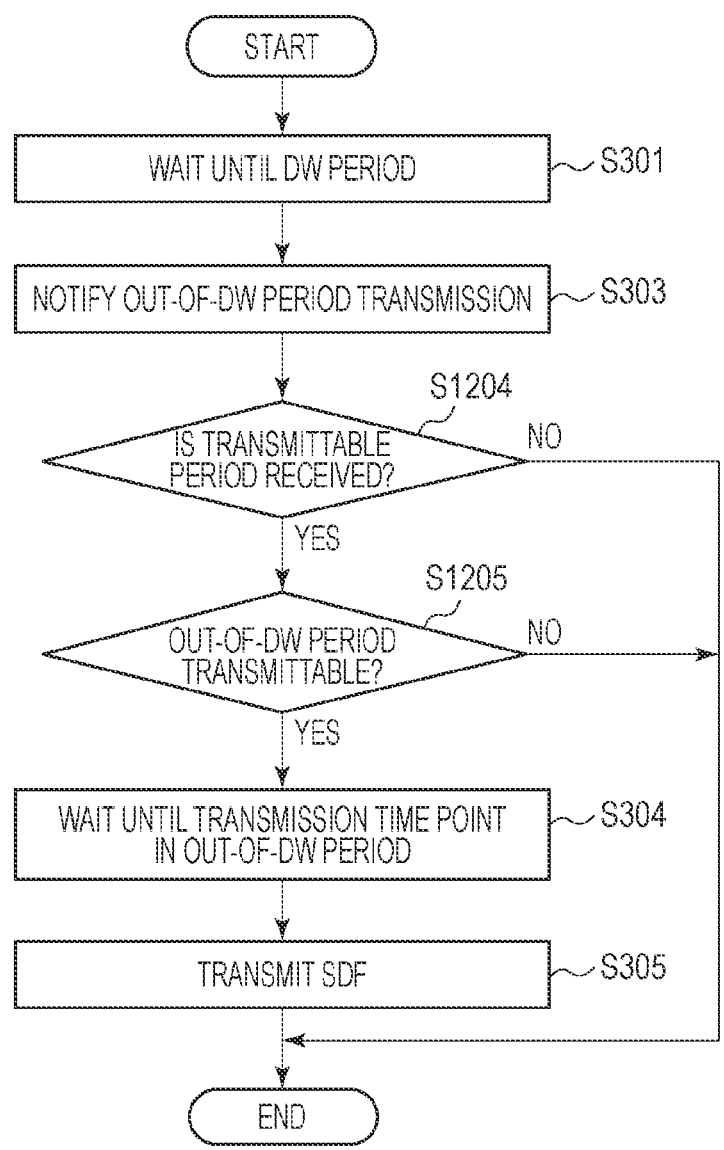
FIG. 10 is a flowchart illustrating operations to be performed by a communication apparatus.

Operations to be performed by the communication apparatus 200 (one of the terminals 101 to 103) for negotiating a transmission time point for a frame between apparatuses before the frame is transmitted outside a DW will be described with reference to the flowchart illustrated in FIG. 10. The flowchart illustrated in FIG. 10 is started when the communication apparatus 200 determines to transmit an SDF having a size larger than a predetermined value. The flowchart illustrated in FIG. 10 is implemented by execution of a control program stored in the storage unit 201 and execution of arithmetic operations and modifications on information and control over hardware by the control unit 202 in the communication apparatus 200. Some or all of steps in the flowchart illustrated in FIG. 10 may be configured to be implemented by hardware such as an ASIC.

Like numbers refer to like steps of the processing in the flowcharts in FIG. 3 and FIG. 10, and repetitive detail descriptions will be omitted.

Referring to FIG. 10, the communication apparatus 200 waits until a DW period starts (S301) and notifies an out-of-DW period transmission (S303). The communication apparatus 200 then determines whether a transmittable period notification describing a communicable time outside a DW period has been received from the other communication apparatus or not (S1204). The transmittable period notification may have the same frame configuration illustrated in FIG. 9. If the transmittable period notification describing a communicable time outside a DW period has not been received from the other communication apparatus, the communication apparatus 200 exits the processing.

On the other hand, if the transmittable period notification describing a communicable time outside a DW period has been received from the other communication apparatus, the communication apparatus 200 determines whether an SDF is to be transmitted outside a DW period or not based on the received information and a communicable time outside a DW period of the communication apparatus 200 (S1205).

When the communication apparatus 200 includes information designating a transmission time point in the out-of-DW transmission notification frame to be transmitted, the other communication apparatus may transmit information describing a communicable time in the designated transmission time point. In other words, in this case, the communication apparatus 200 may determine to transmit an SDF outside a DW period in response to the notification of a transmittable period.

If the communication apparatus 200 determines not to transmit an SDF outside a DW period, the processing ends. On the other hand, if the communication apparatus 200 determines to transmit an SDF outside a DW period, the communication apparatus 200 waits until a transmission time point outside a DW period (S304) and then transmits the SDF (S305).

Because the transmitting side and the receiving side negotiates the transmission time point for a frame, the SDF can be communicated securely outside a DW period.

Instead of adjustment of the timing both in the transmitting side and the receiving side, the transmitting side may notify the presence of a frame to be transmitted outside a DW, and the receiving side may determine the timing for receiving the frame. In this case, the receiving side notifies the time point when the receiving side receives the frame to the transmitting side.

Figure 11:
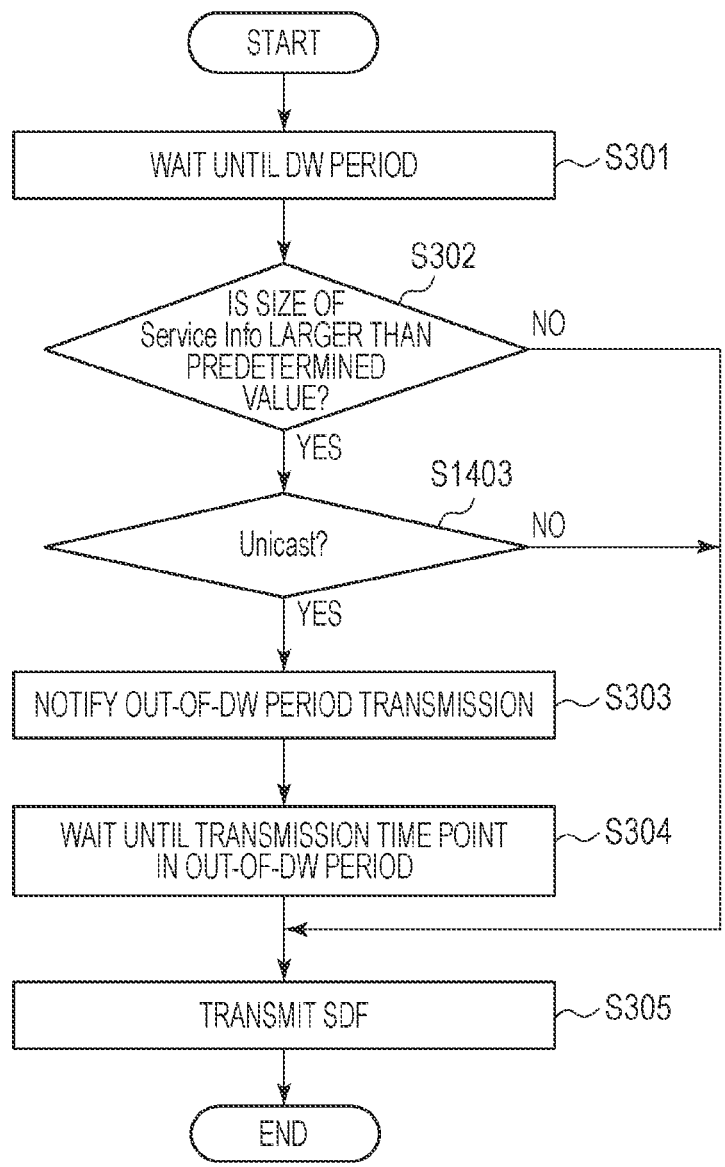
FIG. 11 is a flowchart illustrating operations to be performed by a communication apparatus.

In a case where a multicast or broad cast transmission is performed for transmitting an SDF having a size larger than a predetermined value, the SDF may be transmitted in a DW period. Operations to be performed by the communication apparatus 200 (one of the terminals 101 to 103) for performing a multicast or broadcast transmission of an SDF having a size larger than a predetermined value in a DW period will be described with reference to a flowchart illustrated in FIG. 11. The flowchart illustrated in FIG. 11 is started when the communication apparatus 200 determines to transmit an SDF. The flowchart illustrated in FIG. 11 is implemented by execution of a control program stored in the storage unit 201 and execution of arithmetic operations and modifications on information and control over hardware by the control unit 202 in the communication apparatus 200. Some or all of steps in the flowchart illustrated in FIG. 11 may be configured to be implemented by hardware such as an ASIC.

Like numbers refer to like steps of the processing in the flowcharts in FIG. 3 and FIG. 11, and repetitive detail descriptions will be omitted.

Referring to FIG. 11, the communication apparatus 200 waits until a DW period starts (S301) and determines whether the size of an SDF to be transmitted is larger than a predetermined value or not (S302). If the size of the SDF to be transmitted is smaller than the predetermined value, the communication apparatus 200 transmits the SDF in the DW period (S305). On the other hand, if the size of the SDF to be transmitted is larger than the predetermined value, the communication apparatus 200 determines whether the SDF is to be transmitted by unicasting or not (S1403). If the SDF is not to be transmitted by unicasting, that is, if the SDF is to be transmitted by multicasting or broadcasting, the SDF is transmitted in a DW period (S305).

The frame to be transmitted by multicasting or broadcasting is to be received by a plurality of terminals participating in a NAN cluster. If the frame is transmitted outside a DW period, the plurality of terminals may be required to be an awake state in which wireless communication is enabled, which consumes more power than a sleep state in which wireless communication is disabled, outside a DW period. Therefore, transmitting a frame by multicasting or broadcasting outside a DW period may result in increased power consumption of the entire NAN cluster because a plurality of terminals participating in the NAN cluster have an awake state outside a DW period. A frame may be transmitted by multicasting or broadcasting in a DW period even when the length of the Service Info exceeds 255 bytes to inhibit an increase of the power consumption of the entire NAN cluster.

In a case where an SDF having a size larger than a predetermined size is to be transmitted by multicasting or broadcasting in a DW period, the information may be divided and a plurality of SDFs smaller than the predetermined size may be transmitted to reduce occupation of a DW period by the transmitting apparatus. Transmitting a plurality of SDFs by the dividing can keep fairness of the transmission opportunity because a conflict of the transmission opportunity with another terminal occurs every time one SDF is transmitted. In this case, the communication apparatus 200 may divide information by 255 bytes and transmit the divided information pieces as a plurality of SDFs of the Service Info. In a case where all information may not be transmitted within one DW period, the remaining SDFs which have not been transmitted yet may be carried over to the next DW period and may be transmitted then.

On the other hand, if it is determined in S1403 to transmit by unicasting an SDF to be transmitted, the communication apparatus 200 notifies an out-of-DW period transmission to the other communication apparatus (S303). The communication apparatus 200 waits until a transmission time point outside a DW period (S304) and then transmits the SDF (S305).

According to this embodiment, as described above, in a case where an SDF having a larger size than a predetermined value size is transmitted by multicasting or broadcasting, the SDF is to be transmitted in a DW period. Thus, an increase of power consumption of the entire NAN cluster can be inhibited. According to this embodiment, the occupation of a predetermined period for communicating service information by one communication apparatus can be reduced, and another apparatus can be caused to recognize the communication of service information outside the predetermined period.

OTHER EMBODIMENTS

The present invention may be implemented by processing executed by supplying a program for implementing one of more functions of the aforementioned embodiment to a computer of a system or an apparatus over a network or through a storage medium and reading the program by one or more processors in the system or apparatus. The present invention can also be implemented by a circuit (such as an ASIC) implementing one or more functions.

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
at least one processor and at least a memory in communication with the at least one processor and having instructions stored thereon, wherein the instructions, when executed by the at least one processor, cause the at least one processor to act as:
a first communication unit configured to perform first communication regarding a service with another communication apparatus in a Discovery Window (DW) period that complies with Neighbor Awareness Networking (NAN) standard, wherein at least one of Publish and Subscribe complying with the NAN standard is communicated in the first communication; and
a transmission unit configured to transmit a first frame that complies with the NAN standard and includes first information on a period that is not within the DW period, wherein the first frame is different from the Publish and the Subscribe,
wherein the first communication unit performs a second communication with the another communication apparatus in the period that is not within the DW period and is based on the first information.

2. The communication apparatus according to claim 1, wherein the first frame includes the information on candidate periods for the second communication in the communication apparatus.

3. The communication apparatus according to claim 1, wherein the first frame includes information indicating a channel for performing the second communication with the another communication apparatus.

4. The communication apparatus according to claim 3, wherein the first frame is a beacon.

5. The communication apparatus according to claim 4, wherein the beacon is a Synchronization Beacon that complies with the NAN standard.

6. The communication apparatus according to claim 1, wherein the first communication unit performs the second communication with the another communication apparatus in a case where a size of information of the service communicated with the another communication apparatus is larger than a predetermined value.

7. The communication apparatus according to claim 1, wherein the first frame is different from the Publish, the Subscribe and Follow-up that comply with the NAN standard.

8. The communication apparatus according to claim 1, wherein the transmission unit is further configured to transmit the first frame after the first communication unit communicates the Publish and the Subscribe.

9. The communication apparatus according to claim 1, wherein the first communication unit is further configured to communicate Service Discovery Frame (SDF) in the period that is not within the DW period.

10. The communication apparatus according to claim 1, wherein the service is a printing service.

11. The communication apparatus according to claim 1, wherein the first communication unit communicates service information in the period that is not within the DW period.

12. The communication apparatus according to claim 1, wherein the first communication unit is further configured to respond to a frame which has been received in the period that is not within the DW period, in the period that is not within the DW period.

13. The communication apparatus according to claim 1, wherein the transmission unit is further configured to transmit the first frame in the DW period.

14. The communication apparatus according to claim 1, wherein the communication apparatus is further configured to wait for data transmission until a period indicated by the first information starts.

15. The communication apparatus according to claim 1, wherein the communication apparatus is further configured to acquire, from the another communication apparatus, information on the period that is not within the DW period during which the another communication apparatus is able to communicate.

16. The communication apparatus according to claim 1, wherein the communication apparatus is a printer that has a printing function.

17. A communication method to be executed by a communication apparatus, the method comprising:
performing first communication regarding a service with another communication apparatus in a Discovery Window (DW) period that complies with Neighbor Awareness Networking (NAN) standard, wherein at least one of Publish and Subscribe complying with the NAN standard is communicated in the first communication;
transmitting a first frame that complies with the NAN standard and includes first information on a period that is not within the DW period, wherein the first frame is different from the Publish and the Subscribe; and
performing a second communication with the another communication apparatus in the period that is not within the DW period and is based on the first information.

18. A non-transitory computer-readable storage medium storing a computer program for implementing a communication method executed by a communication apparatus, the method comprising:
performing first communication regarding a service with another communication apparatus in a Discovery Window (DW) period that complies with Neighbor Awareness Networking (NAN) standard, wherein at least one of Publish and Subscribe complying with the NAN standard is communicated in the first communication;

transmitting a first frame that complies with the NAN standard and includes first information on a period that is not within the DW period, wherein the first frame is different from the Publish and the Subscribe; and performing a second communication with the another communication apparatus in the period that is not within the DW period and is based on the first information.

* * * * *